United States Patent [19]

Kesler

[11] 3,972,457
[45] Aug. 3, 1976

[54] SKI RACK FOR VEHICLES WITH OUTSIDE MOUNTED TIRES

[76] Inventor: Gordon Maynard Kesler, 2506 W. 3965 South, Granger, Utah 84119

[22] Filed: Sept. 17, 1974

[21] Appl. No.: 506,879

Related U.S. Application Data

[63] Continuation-in-part of Ser. No. 322,443, Jan. 10, 1973, abandoned.

[52] U.S. Cl. ..................... 224/42.42 R; 224/42.13
[51] Int. Cl.² ........................................... B60R 9/12
[58] Field of Search .... 224/42.42 R, 29 R, 42.03 R, 224/42.13, 42.14, 42.16, 42.26, 42.45 R

[56] References Cited
UNITED STATES PATENTS

| 1,600,729 | 9/1926 | Green | 224/42.16 |
| 1,798,239 | 3/1931 | Welker et al. | 224/42.13 X |
| 2,150,709 | 3/1939 | Bake | 224/29 E |
| 3,333,750 | 8/1967 | Porter | 224/29 R |

FOREIGN PATENTS OR APPLICATIONS

| 355,238 | 12/1937 | Italy | 224/42.03 R |
| 200,882 | 1/1939 | Switzerland | 224/42.03 R |

*Primary Examiner*—Robert J. Spar
*Assistant Examiner*—Jerold M. Forsberg
*Attorney, Agent, or Firm*—Trask & Britt

[57] ABSTRACT

A ski rack is disclosed with a unique mounting means designed to fit securely on an external, rear-mounted, spare tire of a motor vehicle. The rack comprises a central elongated vertical member to which are attached lower and upper ski supporting means and a pair of brackets for securing the rack to an externally mounted spare tire.

5 Claims, 3 Drawing Figures

SKI RACK FOR VEHICLES WITH OUTSIDE MOUNTED TIRES

PRIOR APPLICATIONS

This is a continuation-in-part of U.S. patent application Ser. No. 322,443 filed on Jan. 10, 1973, now abandoned.

BACKGROUND OF THE INVENTION

The sport of skiing is rapidly becoming one of the most popular outdoor sports in America. However, the length of the typical ski presents logistical problems. When skis are transported by a motor vehicle, it is frequently necessary to place the skis on externally mounted ski racks due to their extreme length.

Typical ski racks are not adapted to fit the wide variety of motor vehicles in popular use. One group of vehicles which presents a particular problem for conventional ski racks are recreational and four wheeled drive vehicles. Many of these vehicles have an open cab which precludes the mounting of conventional ski racks. Those recreational and four wheeled drive vehicles which have a closed cab often have high roofs which make it difficult to reach skis mounted there.

One typical feature of recreational and four wheeled drive vehicles is an externally rear-mounted spare tire. The present invention provides a ski rack equipped with a novel mounting device designed to fit on an externally rear-mounted, spare tire. Since the externally rear-mounted tire of most recreational and four wheeled drive vehicles is positioned for easy access, mounting a ski rack on this tire renders the skis more readily accessible and easier to store than conventional roof mounted ski racks.

SUMMARY OF INVENTION

This invention provides for a unique ski rack which is designed to attach securely to an externally rear-mounted, spare tire of a motor vehicle. Specifically, this invention comprises at least one vertical, elongated, vertical support member onto which is attached an upper and lower ski supporting means and a tire clasping means which can attach the ski rack to an externally rear-mounted spare tire of a vehicle.

The upper ski supporting means preferably consists of a horizontal elongated member transversely attached to the upper extremity of the vertical elongated member. Ski securing means are attached to said upper elongated member. The ski securing means can be any one of a number of commercially available ski securing devices. Such ski securing devices include simple strap devices, vise-clamp devices, hinged bars designed to fit securely adjacent the upper elongated member, and flexible strap devices of the type described below in the illustrated embodiment. Commercially available ski locking devices may be fitted on the ski securing means to prevent theft of the skis from the ski rack. A typical locking device consists of an elongated member designed to securely fit over the ski securing device to prevent removal of the skis from the ski securing device.

The lower ski supporting means consists of a horizontal elongated member transversely attached to the lower extremity of said vertical elongated member. Attached to the lower elongated member are ski securing means. These ski securing means can be of the type described above for the upper ski supporting means. The preferred ski securing device for the lower ski supporting means consists of a box or cup device designed so that the end of a ski can securely rest in it. The box or cup device is preferred since it prevents the vertically held skis from slipping out of the ski rack.

The tire clasping means is preferably vertically adjustable and is mounted to the continuous vertical support member intermediate the upper and lower ski supporting means. The vertically adjustable tire clasping means comprises a lower tire clasping bracket mounted for slideable vertical movement along the elongated vertical support member and an upper tire clasping bracket having a pair of upstanding arms in the shape of a "V". The upper V-shaped tire clasping bracket is fixed to the elongated vertical support member whereby each arm of the V-shaped bracket member forms an angle of about 45° with the elongated support member. The mounting brackets are preferably constructed of a rigid piece of metal or plastic, for example, flat strap iron.

As pointed out above, the preferred embodiment for the tire clasping or mounting means consists of an upper and lower tire clasping bracket, having a total of three arcuate shaped arms extending outward therefrom. The upper tire clasping bracket is a single welded V-shaped piece containing two of the three arms and is fixed to the central vertical elongated member. Preferably the V-shaped bracket has the two outwardly extending arms forming an angle of about 45° with the vertical axis of said vertical elongated member and curved to conform to the cross-sectional shape of the sidewall and tread of said externally mounted tire, i.e., the lower bracket is positioned parallel with the lower extremity of said vertical member and positioned to conform to the cross-sectioned shape of the sidewalls and tread of the externally mounted spare tire. The lower bracket can be moved vertically along the vertical axis of said vertical elongated member by adjustment means to allow the tire clasping means to be loosened and tightened to the spare tire. In the preferred embodiment the adjustable means consists of a threaded bolt placed through a metal extension extending horizontally from said vertical member and a metal extension extending horizontally from the lower bracket. Screws are placed on the threaded bolt outside the flanges' metal extension. The adjustable means may be attached to the side of said vertical member which is placed adjacent to said spare tire or the adjustable means may be placed on any of the three remaining faces of said vertical member.

Generally, the alternative configuration for the adjustable means will be placed on the rear face of said vertical elongated member.

Preferably the lower bracket is made out of a flat metal or plastic bar substantially wider than said vertical member and the straight portion of said bracket is bent horizontally to said vertical member adjacent to the curved arm of the bracket portion. A hole is formed in the horizontally bent portion of bracket and said vertical member is fitted through the hole so that the lower bracket may move freely along the vertical axis of said vertical member. The remaining noncurved portion of the lower bracket is bent to run parallel to said vertical member and fitted with the above-described adjustable means. After the lower bracket has been positioned about said tire, the lower bracket is firmly secured in place by a U-clamp.

DESCRIPTION OF THE ILLUSTRATED EMBODIMENT

Figure 1:
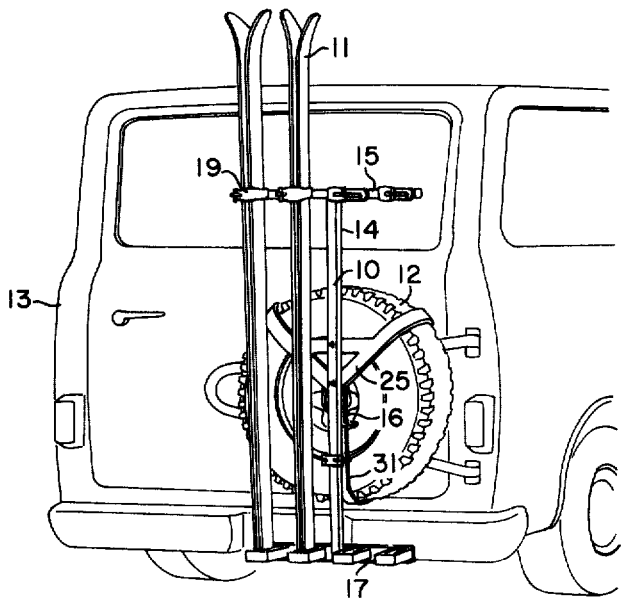
FIG. 1 is an elevational view of the ski rack attached to an externally rear-mounted spare tire.

FIG. 1 is an illustration of the ski rack of this invention 10, securing skis 11, attached to an externally rear-mounted spare tire 12 of a motor vehicle 13. Although the upper ski support means 15 is shown behind the rear window of the vehicle, it is preferred that this transverse support means be located above or below window level. As indicated hereinafter, a preferred length for vertical member 14 is from about 3 to 4 feet long.

Figure 2:
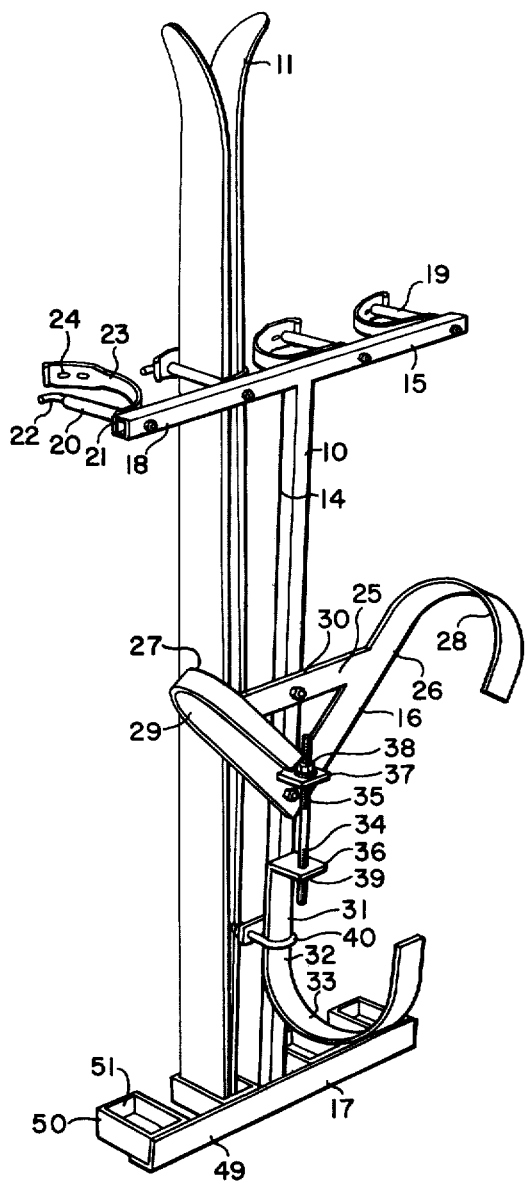
FIG. 2 is a perspective view of the ski rack.

The preferred embodiment of the invention is illustrated further in FIG. 2. The instant ski rack 10 is comprised of a central elongated vertical member 14. Said elongated vertical member is attached to an upper ski supporting means 15, an externally rear-mounted spare tire clasping means 16, and a lower ski supporting means 17. Said elongated vertical member 14 is typically a rigid metal, plastic or wooden rod. In the preferred embodiment said elongated vertical member is made of hollow steel about 1 inch square and about 4 feet long. The length of said elongated vertical member and the length of the resultant ski rack may be substantially varied to meet the physical environment of the externally rear-mounted spare tire 12 and the vehicle 13 said tire is mounted upon.

The upper ski supporting means 15 preferably comprises a horizontal elongated member 18 transversely attached to the upper extremity of said elongated vertical member 14. Said upper horizontal elongated member 18 is typically a rigid metal, plastic or wooden rod. The preferred embodiment of said upper horizontal member 18 is a hollow steel rod about one inch square and about 2 feet long. The length of said upper horizontal member 18 may be substantially varied to meet the physical environment of said externally, rear-mounted spare tire 12 and said vehicle 13. The upper horizontal member 18 is in substantially the same plane as the longitudinal axis of said elongated vertical member 14.

A plurality of ski securing means 19 are located along said horizontal elongated member 18. The ski securing means may be comprised of any of a number of commercially available ski securing devices including straps and clamping devices. The illustrated ski securing means 19 comprises a rod 20 about 4 inches long and a flexible strap 23. One end 21 of said rod 20 is attached horizontally to the upper horizontal member 18 and the opposed end 22 is formed into a hook. A flexible strap 23, preferably rubber, leather or plastic, about 6 inches long, is securely attached to said rod 20 adjacent to the upper horizontal member 18. A series of holes 24 are formed laterally in said strap 23. The strap 23 is securely fitted over the hooked end 22 of the rod 20, holding the upper end of a pair of skis 11 to the upper ski supporting means. By alternating which hole 24 is attached over the hooked end 22 of the rod 20, the size of the skis is secured and the tension of the securing strap 23 can be varied.

The tire clasping means 16 is attached to said elongated vertical member 14 about midway between the upper 15 and lower 17 ski securing means. The exact position may be varied to meet the environment presented by said externally rear-mounted tire 12 and said vehicle 13.

The upper portion of the tire clasping means 16 consists of a V-shaped bracket 25 shaped to conform substantially to the contour of said rear-mounted spare tire 12. The V-shaped bracket 25 can be made of a rigid plastic or metal means. In the illustrated embodiment the upper tire clasping bracket 25 consists of two arms 26, 27 which project in a V-shape upward and then arcuately in the opposite direction from the ski securing means. Said arms 26 and 27 are preferably welded together to form a single piece having an angle of about 45° from the vertical plane of said vertical member. The end or arcuate shaped portions of the brackets 28 and 29, respectively, are shaped to conform substantially to the shape of the tire tread and sidewall cross-section. The radii of curvature of the arcuate portions 28 and 29 are from 5 to about 6 inches. A connecting brace 30 is attached to each of the two arms 26 and 27 for added support. The connecting brace 30 is also attached to the elongated vertical support member. Arms 26 and 27 are preferably spaced about 8 inches to about 18 inches apart at their uppermost portions, with about 14 inches being typical.

In the illustrated embodiment the upper V-shaped bracket of said tire clasping means 16 is securely fixed to said elongated vertical member 14; however, it is possible for the upper bracket to be attached to said elongated vertical member 14 in a manner which allows movement similar to the lower bracket 31 of the tire clasping means described below.

The lower bracket 31 of the tire clasping means 16 is adjustably secured to said elongated vertical member 14. The end portion 33 of the lower bracket 31 is the tire contacting portion and is shaped to conform substantially to the shape of the tire tread and sidewall cross-section. The radii of curvature of these arcuate or end portions 33 is from about 3 to about 6 inches.

In the illustrated embodiment, the lower bracket 31 is adjustably secured by an adjustment means 34. The adjustment means 34 consists of a threaded bolt 35 which runs through an opening in an extension 36 which is attached to the lower bracket 31 horizontally to the vertical axis of said elongated vertical member 14 and attached to said upper bracket 25 through an upper extension 37 which extends outward in an horizontal plane perpendicular to the vertical axis of said elongated vertical member 14. The adjusting means 34 is located on the side of the vertical member 14 from which the bracket arms project. The lower bracket 31 is movable along the vertical axis of said bolt 35 and is secured by means of nuts 38 and 39 located on the outer surfaces of the extensions 36 and 37. After adjustment of the lower bracket 31 so that the tire clasping means 16 is secured to the externally rear-mounted spare tire 12, the lower bracket 31 is firmly secured to said vertical member 14 by means of a U-shaped clamp 49 at or near point 32.

Figure 3:
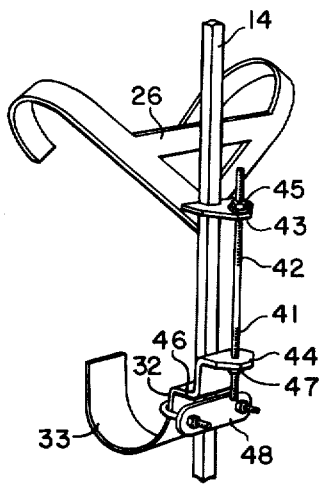
FIG. 3 is a partial perspective view illustrating an alternative adjustment means for the ski rack.

An alternative adjusting means for the lower bracket 31 of the tire clasping means 16 is shown in FIG. 3. The alternative adjusting means 41 has the adjusting means extending from the side opposite the arcuate arms of the upper and lower mounting brackets. These consist of a threaded bolt 42 which runs through extension 43 which is horizontally connected to said vertical member to the vertical axis of said vertical member 14 and runs through extension 44 which is a horizontal extension from the straight portion of the lower bracket at point 32. The threaded bolt 42 is secured by two screws 45 and 46 located on the outer edges of the extension. At point 32, the bracket is bent at a right angle 47 to the vertical axis of said elongated vertical member 14. The elongated vertical member 14 extends through a hole in the horizontal section 46. The lower bracket can be moved vertically along said vertical member 14. Once the lower bracket is secured about the externally, rear-mounted tire, the lower bracket is fixed in place by means of a U-shaped clamp 48.

The lower ski supporting means 17 consists of a horizontal elongated member 49 transversely attached to the lower extremity of said elongated vertical member 14 and a plurality of ski securing means 50. The horizontal elongated member preferably consists of a metal, wooden or plastic rod. In the illustrated embodiment the horizontal member 49 consists of a piece of steel angle iron approximately 18 inches long. The lower ski securing means can consist of any of a number of commercially available ski securing devices including straps, clamping devices and the device described above for the upper ski securing means 19. In the illustrated embodiment the lower ski securing means 50 consists of a box-shaped cup which is about 4 inches long, about 2 inches wide and about 1½ inches deep. The top of the cup 51 is open so the ends of a pair of skis 11 can fit securely in the cup 50. Since the ski rack 10 is fitted vertically on the externally rear-mounted tire 12, this cup type of device prevents the skis from falling from the ski rack.

It is preferred that elongated vertical member 14 be from about 3 to about 4 feet long and that the upper and lower ski support means be located at the opposite extremities of each member. A length shorter than about 3 feet provides insufficient support for long skis while lengths greater than 4 feet are too great for short children's skis. The preferred spacing of 3 to 4 feet is greater than that normally associated with car-top racks inasmuch as the skis project vertically above the roof of most vehicles to which the instant ski rack is attached, thereby receiving a substantial wind load. Also, because the rear window location of most vehicles having an externally rear-mounted spare tire is substantially adjacent the top portion of the tire, it is preferred to have the upper ski supporting means 15 at least about 1 foot above the arcuate arms 28 and 29 to minimize interference with the driver's rearward view.

It is further preferred that the upper and lower ski supporting means 15 and 17 be substantially parallel and have longitudinal axes in the same plane as the longitudinal axis of the elongated vertical member 14. Also, it is preferred that the upper and lower ski securing means 19 and 50 are located on the same side of the elongated vertical member 14 and that the tire mounting means 16 project away from said ski securing means on the opposite side of the elongated vertical member 14.

Although the ski supporting means 15 and 17 may be of the same length, it is preferred that upper ski supporting means 15 be slightly longer than lower ski supporting means 17 to provide spacing between skis sufficient to accommodate ski bindings attached thereto. The lower ski supporting means may be relatively short to minimize weight. A minimum spacing of about 2 inches is required between cups 50. A minimum spacing between upper ski securing means 19 is about 4 inches and a spacing about 5 to 6 inches is preferred.

While the invention has been described with reference to specific embodiments, it should be understood that certain other changes in construction may be made by one skilled in the art and would not thereby depart from the spirit and scope of this invention which is limited only by the claims appended hereto.

I claim:

1. A ski rack adapted for mounting to a rear mounted spare tire of a vehicle comprising:

a singular continuous, substantially elongated vertical support member, a lower ski supporting means perpendicularly and centrally mounted to the lower extremity of said elongated vertical support member for receiving the heel or tail portion of a vertically positioned upstanding ski, an upper ski supporting means perpendicularly and centrally mounted to the upper extremity of said elongated vertical support member for firmly retaining a ski in a vertical upstanding position, and a vertically adjustable tire clasping means mounted to said elongated vertical support member intermediate said upper and lower ski supporting means for attaching said ski rack to a rear mounted spare tire of a vehicle, said vertically adjustable tire clasping means comprising a lower tire clasping bracket mounted for adjustable vertical movement along said elongated vertical support member with screw adjustment means and clamp means holding said clasping means to said vertical support member and an upper V-shaped tire clasping bracket fixed to said elongated vertical support member whereby each arm of said upper V-shaped tire clasping bracket is fixed at an angle of about 45° to said elongated vertical support member.

2. The ski rack of claim 1 wherein said lower ski supporting means comprises a horizontal, elongated member having a plurality of ski supporting members mounted thereto, each ski supporting member being adapted to support a pair of skis.

3. The ski rack of claim 2 wherein said upper ski supporting means comprises a horizontal elongated member having a plurality of ski retaining members mounted thereto, each retaining member being adapted to retain a pair of skis.

4. The ski rack of claim 3 wherein said horizontal elongated member of said upper ski supporting means is of longer length than said horizontal elongated member of said lower ski supporting means.

5. The ski rack of claim 4 wherein each of said ski retaining members includes a flexible strap and a rod fastened to said horizontal elongated member for encompassing and holding said skis firmly thereto.

* * * * *